(12) United States Patent
Yocum et al.

(10) Patent No.: US 6,433,771 B1
(45) Date of Patent: Aug. 13, 2002

(54) HAPTIC DEVICE ATTRIBUTE CONTROL

(75) Inventors: Todd Yocum, Ann Arbor; Thomas M. Peurach, Novi, both of MI (US)

(73) Assignee: Cybernet Haptic Systems Corporation, Ann Arbor, MI (US)

( * ) Notice: Subject to any disclaimer, the term of this patent is extended or adjusted under 35 U.S.C. 154(b) by 0 days.

(21) Appl. No.: 08/859,157

(22) Filed: May 20, 1997

Related U.S. Application Data

(60) Continuation-in-part of application No. 08/854,375, filed on May 12, 1997, now Pat. No. 5,831,408, which is a continuation of application No. 08/543,606, filed on Oct. 16, 1995, now Pat. No. 5,629,594, which is a continuation-in-part of application No. 08/257,070, filed on Jun. 9, 1994, now Pat. No. 5,459,382, which is a division of application No. 07/984,324, filed on Dec. 2, 1992, now Pat. No. 5,389,865.
(60) Provisional application No. 60/017,684, filed on May 21, 1996.

(51) Int. Cl.[7] .................................. G09G 5/00

(52) U.S. Cl. .................. 345/156; 345/157; 345/161; 345/163

(58) Field of Search ................ 345/156, 157, 345/161, 163

(56) References Cited

U.S. PATENT DOCUMENTS

| 3,919,691 A | 11/1975 | Noll | 340/172.5 |
|---|---|---|---|
| 4,477,043 A | 10/1984 | Repperger | 244/223 |
| 4,560,983 A | 12/1985 | Williams | 340/825 |
| 4,706,294 A | 11/1987 | Ouchida | 381/109 |
| 4,800,721 A | 1/1989 | Comenska et al. | 60/393 |
| 4,823,634 A | 4/1989 | Culver | 74/471 |
| 4,861,269 A | 8/1989 | Meenen, Jr. | 434/45 |
| 4,868,549 A | 9/1989 | Affinito et al. | 340/710 |

(List continued on next page.)

FOREIGN PATENT DOCUMENTS

| EP | 626634 A2 | 11/1994 |
|---|---|---|
| WO | WO95/20788 | 8/1995 |
| WO | WO95/32459 | 11/1995 |
| WO | WO97/21160 | 11/1996 |
| WO | WO 98/49614 | 11/1998 |
| WO | WO 98/58308 | 12/1998 |

OTHER PUBLICATIONS

P. Kilpatrick, "The Use of a Kinesthetic Supplement in an Interactive Graphics System," the University of North Carolina at Chapel Hill, 1976.
L. Jones, I. Hunter, "A perceptual analysis of stiffness," Experimental Brain Research, 1990, pp. 150–156.
S. Jacobsen, F. Smith, D. Backman, E. Iversen, High Performance, High Dexterity, Force Reflective Teleoperator II.
L. Rosenberg, "A Force Feedback Programming Primer".
P. Fisher, R. Daniel, K.V. Siva; "Specification and Design of Input Devices for Teleoperation," 1990 IEEE, pp. 540–545.

(List continued on next page.)

*Primary Examiner*—Dennis-Doon Chow
*Assistant Examiner*—Alecia D. Nelson
(74) *Attorney, Agent, or Firm*—Townsend and Townsend and Crew LLP

(57) ABSTRACT

In a force-reflection system wherein a basic force pattern including a plurality of behavioral attributes is applied to a user-moveable member, apparatus and methods are disclosed for altering one or more of the behavioral attributes without changing the basic force pattern. The invention may be used to adjust attributes such as amplitude maximum and average, play-out rate, and play-out lead/lag in conjunction with any type of user-manipulable member, including a joystick, wheel, yoke, or non-contact arrangement. The invention may be implemented at a high or low level, and arrays of haptic controls or equivalent graphical user interface (GUI) elements may be used to define haptic force temporal sequences for replay.

19 Claims, 9 Drawing Sheets

Select Time Window From Long Force Sequence

U.S. PATENT DOCUMENTS

| | | | |
|---|---|---|---|
| 4,949,119 A | 8/1990 | Moncrief et al. | 364/578 |
| 4,964,004 A | 10/1990 | Barker | 360/14.1 |
| 4,983,901 A | 1/1991 | Lehmer | 318/685 |
| 5,007,300 A | 4/1991 | Siva | 74/471 |
| 5,044,956 A | 9/1991 | Behensky et al. | 434/45 |
| 5,076,517 A | 12/1991 | Ferranti et al. | 244/228 |
| 5,103,404 A | 4/1992 | McIntosh | 318/568.22 |
| 5,107,080 A | 4/1992 | Rosen | 200/6 A |
| 5,142,931 A | 9/1992 | Menahem | 74/471 |
| 5,146,566 A | 9/1992 | Hollis, Jr. et al. | 395/275 |
| 5,184,319 A | 2/1993 | Kramer | 364/806 |
| 5,185,561 A * | 2/1993 | Good et al. | 345/156 |
| 5,186,629 A | 2/1993 | Rohen | 434/114 |
| 5,191,645 A | 3/1993 | Carlucci et al. | 395/159 |
| 5,193,963 A | 3/1993 | McAffee et al. | 414/5 |
| 5,197,003 A | 3/1993 | Moncrief et al. | 364/410 |
| 5,220,260 A | 6/1993 | Schuler | 318/561 |
| 5,223,776 A | 6/1993 | Radke et al. | 318/561.1 |
| 5,264,768 A | 11/1993 | Gregory et al. | 318/561 |
| 5,354,162 A | 10/1994 | Burdea et al. | 414/5 |
| 5,381,080 A | 1/1995 | Schnell et al. | 318/566 |
| 5,389,865 A | 2/1995 | Jacobus et al. | 318/568.11 |
| 5,392,284 A | 2/1995 | Sugiyama | 370/84 |
| 5,396,266 A | 3/1995 | Brimhall | 345/161 |
| 5,402,499 A | 3/1995 | Robison et al. | 381/119 |
| 5,414,337 A | 5/1995 | Schuler | 318/561 |
| 5,459,382 A | 10/1995 | Jacobus et al. | 318/568.11 |
| 5,513,100 A | 4/1996 | Parker et al. | 364/167.01 |
| 5,524,195 A | 6/1996 | Clanton, III et al. | 395/155 |
| 5,526,480 A | 6/1996 | Gibson | 395/154 |
| 5,576,727 A | 11/1996 | Rosenberg et al. | 345/179 |
| 5,583,478 A | 12/1996 | Renzi | 340/407.1 |
| 5,587,937 A | 12/1996 | Massie et al. | 364/578 |
| 5,588,139 A | 12/1996 | Lanier et al. | |
| 5,589,854 A | 12/1996 | Tsai | 345/161 |
| 5,619,180 A | 4/1997 | Massimino et al. | 340/407.1 |
| 5,621,805 A | 4/1997 | Loh et al. | 381/119 |
| 5,623,582 A | 4/1997 | Rosenberg | 395/99 |
| 5,625,576 A | 4/1997 | Massie et al. | 364/578 |
| 5,642,469 A | 6/1997 | Hannaford et al. | 395/99 |
| 5,643,087 A | 7/1997 | Marcus et al. | 463/38 |
| 5,666,138 A | 9/1997 | Culver | 345/161 |
| 5,691,898 A | 11/1997 | Rosenberg et al. | 364/190 |
| 5,696,537 A * | 12/1997 | Solhjell | 345/164 |
| 5,709,219 A | 1/1998 | Chen et al. | 128/782 |
| 5,714,978 A | 2/1998 | Yamanaka et al. | 345/157 |
| 5,721,566 A | 2/1998 | Rosenberg | 345/161 |
| 5,731,804 A | 3/1998 | Rosenberg | 345/156 |
| 5,734,373 A * | 3/1998 | Rosenberg et al. | 345/161 |
| 5,739,811 A * | 4/1998 | Rosenberg et al. | 345/161 |
| 5,742,278 A | 4/1998 | Chen et al. | 345/156 |
| 5,767,457 A * | 6/1998 | Gerpheide et al. | 345/156 |
| 5,767,839 A * | 6/1998 | Rosenberg | 345/156 |
| 5,781,172 A | 7/1998 | Engel et al. | 345/164 |
| 5,784,052 A * | 7/1998 | Keyson | 345/167 |
| 5,790,108 A | 8/1998 | Salcudean et al. | 345/184 |
| 5,802,353 A | 9/1998 | Avila et al. | 395/500 |
| 5,805,140 A * | 9/1998 | Rosenberg et al. | 345/156 |
| 5,825,308 A | 10/1998 | Rosenberg | 341/20 |
| 5,828,363 A * | 10/1998 | Yaniger et al. | 345/156 |
| 5,884,029 A | 3/1999 | Brush, II et al. | 395/200.32 |
| 5,889,670 A | 3/1999 | Schuler et al. | 364/186 |
| 5,944,151 A | 8/1999 | Jakobs et al. | 188/267.1 |
| 5,959,613 A | 9/1999 | Rosenberg et al. | 345/161 |
| 5,999,168 A | 12/1999 | Rosenberg et al. | 345/161 |
| 6,005,551 A | 12/1999 | Osborne et al. | 345/161 |
| 6,028,593 A | 2/2000 | Rosenberg et al. | 345/156 |
| 6,046,726 A * | 3/2000 | Keyson | 345/156 |
| 6,147,674 A | 11/2000 | Rosenberg et al. | 345/157 |

OTHER PUBLICATIONS

A. Kelley, S. Salcudean, "MagicMouse: Tactile and Kinesthetic Feedback in the Human–Computer Interface using an Electromagnetically Actuated Input/Output Device," Oct. 1993 pp. 1–27.

S. Augustine Su, R. Furuta, "The Virtual Panel Architecture: A 3D Gesture Framework*," 1993 IEEE, pp. 387–393.

Y. Adachi, N. Matsuo, "Sensory Evaluation of Virtual Haptic Push–Buttons," 1994, Suzuki Motor Corp., Technical Research Center, Japan.

S. Wiker, G. Vanderheiden, S. Lee, S. Arndt, "Development of Tactile Mice for Blind Access to Computers" *Proc. of the Human Factors Society 35th Annual Meeting*, 1991, pp. 708–712.

L. Rosenberg, B. Adelstein, "Perceptual Decomposition of Virtual Haptic Surfaces," *Proc. IEEE Symposium on Research Frontiers in Virtual Reality*, Oct. 1993.

L. Rosenberg, "The Use of Virtual Fixtures to Enhance Operator Performance in Time Delayed Teleoperation," U.S. Air Force, Mar. 1993.

B. Schmult, R. Jebens, "Application Areas for a Force–Feedback Joystick," *ASME*, 1993, pp. 47–54.

S. Münch, M. Stangenberg, "Intelligent Control for Haptic Displays," *Furographics '96*, vol. 15, No. 3. pp. C–217–226.

M. Akamatsu, S. Sato, S. McKenzie, "Multimodal Mouse: A Mouse–Type Device with Tactile and Force Display," *Presence*, vol. 3, No. 1, 1994, pp. 73–80.

C. Ramstein, V. Hayward, "The Pantograph: A Large Workspace Haptic Device for a Multimodal Human–Computer Interaction," *Computer–Human Interaction*, 1994.

L. Rosenberg, "Perceptual Design of a Virtual Rigid Surface Contact," U.S. Air Force, Center for Design Research, Stanford Univ., Apr. 1993.

M. Minsky, M. Ouh–young, L. Steele, F. Brooks, Jr., M. Behensky, "Feeling and Seeing: Issues in Force Display," pp. 235–270.

L. Rosenberg, T. Lacey, D. Stredney, M. VanDerLoos, "Commercially Viable Force Feedback Controller for Individuals with Neuromotor Disabilities," U.S. Air Force Armstrong Laboratory, May 1996.

A. Kelley, "On the Development of a Force–Feedback Mouse and its Integration into a Graphical User Interface," Nov. 1994.

C. Ramstein, "Combining Haptic and Braille Technologies: Design Issues and Pilot Study," p. 37–44.

J. Colgate, P. Grafing, M. Stanley, G. Schenkel, "Implementation of Stiff Virtual Walls in Force–Reflecting Interfaces," Northwestern University, Sep. 1993.

J. Payette, V. Hayward, C. Ramstein, D. Bergeron, "Evaluation of a Force Feedback (Haptic) Computer Pointing Device in Zero Gravity," *ASME*, 1996, pp. 547–553.

B. Adelstein, M. Rosen, "Design and Implementation of a Force Reflecting Manipulandum for Manual Control Research," NASA–Ames Research Center, 1992.

R. Ellis, O. Ismaeil, M. Lipsett, "Design and Evaluation of a High–Performance Prototype Planar Haptic Interface," *Advances in Robotics, Mechatronics, and Haptic Interfaces*, vol. 49, Dec. 1993, pp. 56–64.

C. McCoy Winey III, "Computer Simulated Visual and Tactile Feedback as an Aid to Manipulator and Vehicle Control," Massachusetts Institute of Technology, Jun. 1981.

W. Atkinson, K. Bond. G. Tribble, III, K. Wilson, "Computing with Feeling," *Comp. & Graphics*, vol. 2, 1977, pp. 97–103.

M. Ouh–young, M. Pique, J. Hughes, N. Srinivasan, F. Brooks, Jr., "Using a Manipulator for Force Display in Molecular Docking," Univ. of North Carolina at Chapel Hill, 1988, pp. 1824–1829.

M. Russo, "The Design and Implementation of a Three Degree–of–Freedom Force Output Joystick," May, 1990.

M. Akamatsu, S. Sato, "Multimodal Mouse: A Mouse–Type Device with Tactile and Force Display," Presence, vol. 3, No. 1, 1994, pp. 73–80.

S. Fisher, M. McGreevy, J. Humphries, W. Robinett, "Virtual Environment Display Device," Oct. 1986.

J. Blatt, "A Primer on User Interface Software Patents," *The Computer Lawyer*, vol. 9, No. 4, Apr. 1992.

H. Tan et al, "Human Factors for the Design of Force–Reflecting Haptic Interfaces," *ASME WAM*, 1994, pp. 1–11.

\* cited by examiner-

HAPTIC DEVICE ATTRIBUTE CONTROL

REFERENCE TO RELATED APPLICATION

This application is a continuation-in-part of U.S. patent application Ser. No. 08/854,375, filed May 12, 1997, now U.S. Pat. No. 5,831,408, which is a continuation of U.S. patent application Ser. No. 08/543,606, filed Oct. 16, 1995, now U.S. Pat. No. 5,629,594, which is a continuation-in-part of U.S. patent application Ser. No. 08/257,070, filed Jun. 9, 1994, now U.S. Pat. No. 5,459,382, which is a divisional of U.S. patent application Ser. No. 07/984,324, filed Dec. 2, 1992, now U.S. Pat. No. 5,389,865. This application also claims priority of U.S. provisional application Serial No. 60/017,684, filed May 21, 1996, the entire contents of which are all incorporated herein by reference.

FIELD OF THE INVENTION

This invention relates generally to haptic devices and, in particular, to apparatus and methods for controlling behavioral attributes associated with such devices while maintaining a basic pattern of force or tactile feedback.

BACKGROUND OF THE INVENTION

Specialized force-feedback devices originated in the 1960's with the introduction of teleoperations, wherein, typically, a smaller controller or master robot was moved by an operator to control the movements of a larger slave robot. Forces detected at the slave were then fed back to the operator through actuators at the location of the master. Such prior art is discussed in U.S. Pat. Nos. 5,389,865 and 5,459,382 to Jacobus, et al, and also described elsewhere in the literature.

In the late 1980's, NASA funded several programs using force feedback devices which were not identically configured as miniature versions of a slave device. This advance enabled an operator such as an astronaut to control a number of different space-based robots and cranes from a "universal" controller. To realize this concept, the master controller was logically connected to the slave through a network of computers which were capable of translating the master kinematics typically into Cartesian coordinates and from Cartesian to slave kinematics (and back again).

With such computer translation in place on the master side of the system, it becomes possible to send inputs from the master, be it a joystick, wheel, yoke, or other type of manipulator, to a simulated slave rather than to a real one, and to accept forces from the simulation for application to the master as well. The simulation need not represent a real device, like a crane or robot, but may be a simulated vehicle, weapon or other implement. The simulation may also reside in a person performing a task in a virtual world such as walking, handling objects, and touching surfaces). Such innovations are among those disclosed in the patents referenced above.

When forces are generated from an abstract virtual environment, often the meaning of the force sequences is in their relative relationship as opposed to the generation of absolute force values. For instance, one reason why a particular object may seem hard and another soft may be that the "hard" object simply allows less push-in when touched as compared to the other. This kind of relationship may be maintained between virtual objects at any absolute average force output, assuming the ratio of the two values remain the same (and, to a lesser extent, when greater-than and less-than relationships are maintained).

When translating abstract forces to real forces at a force reflecting device, it may be desirable to map the virtual forces down to the scale offered by the device. For instance, when an explosion special effect is played, the shake generated is typically much smaller than would naturally result from the explosion. For many tasks, there is an appropriate level of force which maximizes task performance and user preferences. In addition, some users prefer different levels of average force output. Thus, the need exists for a force-level adjustment for use in conjunction with such devices to meet user and performance requirements.

SUMMARY OF THE INVENTION

This invention provides apparatus and methods for modifying parameters or values in a force-reflection system to alter one or more of the system's behavioral characteristics without changing the basic relative pattern of the force outputs. The invention may be implemented in linear or non-linear fashion and across multiple points in a haptic system, including power output to actuators, controls for the power output system, and at a higher or application level to control lower-level or primitive functions. Arrays of haptic controls or equivalent graphical user interface (GUI) elements may also be used to define haptic force temporal sequences for replay. Overall, the invention may be used to adjust attributes such as amplitude maximum and average, play-out rate, and play-out lead/lag in conjunction with any type of user-manipulable member, including a joystick, wheel, yoke, or non-contact arrangement.

DETAILED DESCRIPTION OF THE INVENTION

Figures 1, 2:
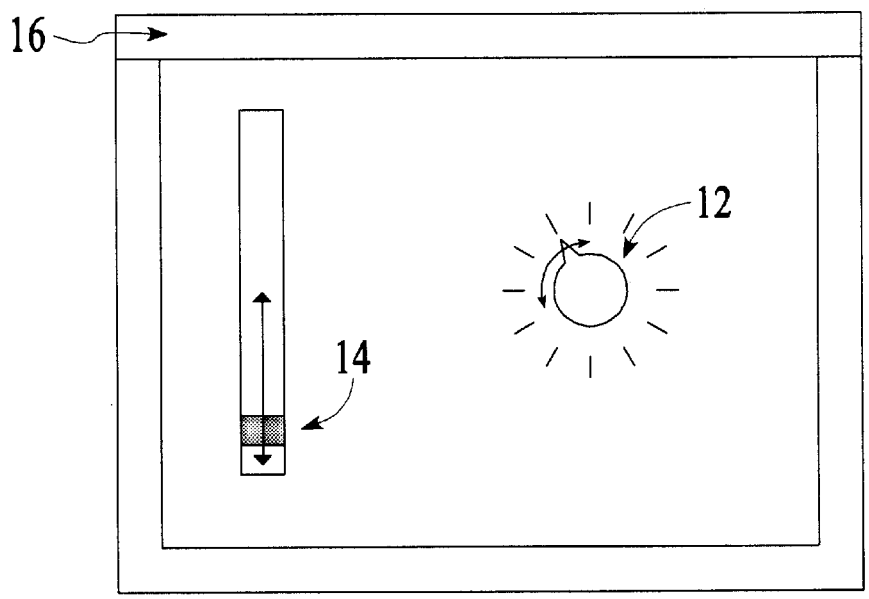
FIG. 1 is a drawing of a computer screen window including graphical icons associated with attribute control according to this invention.
FIG. 2 illustrates how an application programmer interface (API) may be used to implement an attribute control according to the invention.

In a sense, the present invention applies the concept of volume control, which originated with audio amplification, to force-feedback or haptic devices. Broadly, forces are "played" into a force-feedback device through electrical stimuli generated from a computer simulation, model, or tele-operated device in response to an actuator, just as digital samples are played into a sound generator to produce digital audio. As with a volume control, in a haptic device, it may be desirable to change the amplitude. of the play-out without changing the mutual ratio relationships of one sound(?) to another. For audio, this represents changing the loudness. For force feedback, this represents a change in the level of a behavioral attribute associated with the force generated to the user. As such, the "feeling" remains basically the same, even though level of one or more behavioral attributes has been independently modulated.

The present invention is not limited in terms of user input, force generation means or system architecture. That is, the user input may take the form of any movable member, including a joystick, wheel, yoke, or any other type of device, so long as a user may affect its position or orientation in any dimension. The system may also read the position of a user by means of a laser tracking or other optical technology, and return forces to the user through jets of air, magnetism, and so forth. Thus, non-contact architectures are applicable to the invention as well. The force-generation means may likewise assume any form, whether real or virtue, including computer simulations, models and tele-operated slaves, so long as a force pattern is generated in response to a user input. Given this high degree of variability in terms of user input and force generation, overall system architecture may also assume many forms according to the invention.

Reference is made to U.S. Pat. Nos. 5,389,865 and 5,459,382, which are incorporated herein by reference, and which disclose exemplary system architectures to which the present invention is applicable. These patents disclose configurations wherein a multi-axis, user-movable member including an actuator and position sensor associated with each axis, interacts with force-field generation means operative to develop a pattern of force outputs in response to a change in the position of the member. A user interface generates an electrical signal for each of a plurality of degrees of freedom corresponding to the motion of the user member.

In the case of a computer simulation or model, the electrical signals are fed to a virtual reality force field generator which calculates force field values for each of a plurality of degrees of freedom of the user as a function of the generated force field. Motion commands are then fed back to the actuators of the user interface, which provide force to a user interacting therewith. The interface between the user-input device and force-generation means may include one or more controllers in a hierarchy, for example, from a high-level host interface to an embedded device controller or microcomputer. Accordingly, as used herein, the term "computer-controlled interface" shall be understood to mean any and all computer resources operative to mediate appropriate interactions between the user input and force-generation means, regardless of specific implementation.

User control of a particular attribute may also be implemented in a variety of ways according to the present invention, including the use of a slider, knob, or any other suitable form of variable manipulator. In a software embodiment, which would include mediation through a Graphical User Interface (GUI) or Application Programmer Interface (API), a knob 12, slider 14, or other value-generating icon could be manipulated on a computer screen 16 or in a window, as shown in FIG. 1. In the case of an API implementation, manipulation of the icon is used to generate a value which, when relayed through a data structure or function call, eventually modulates the appropriate force-generation hardware, as depicted in FIG. 2.

Figure 3:
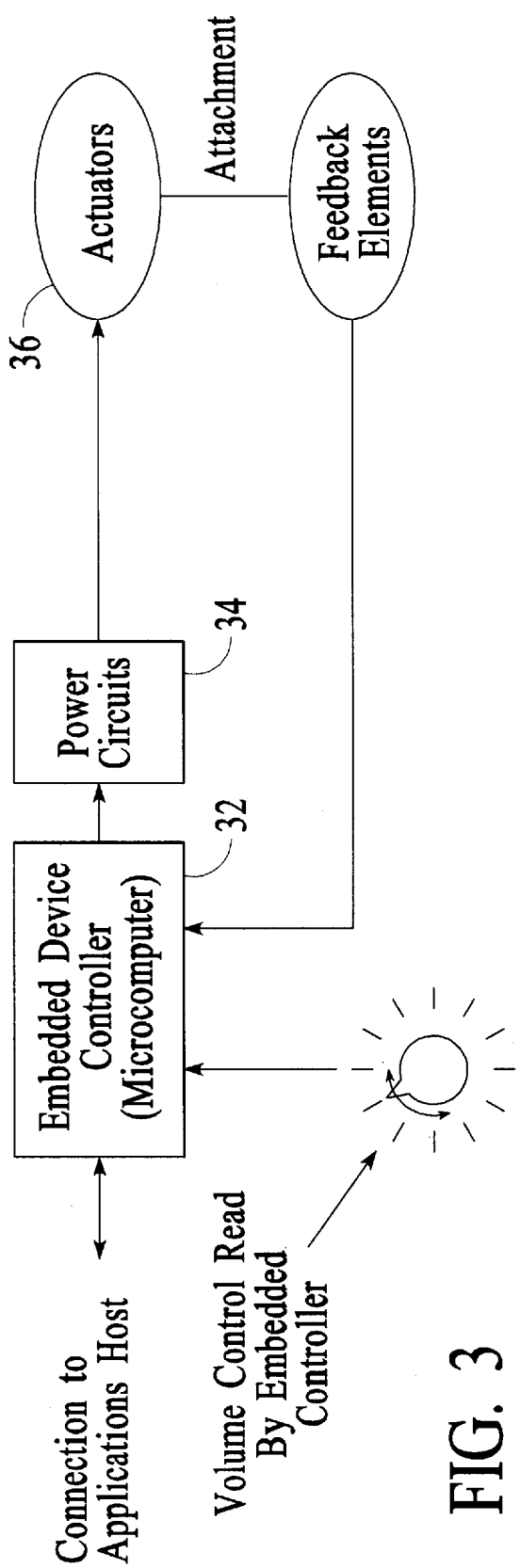
FIG. 3 is a block diagram used to show how the invention may be integrated into a device control architecture.
Figure 4:
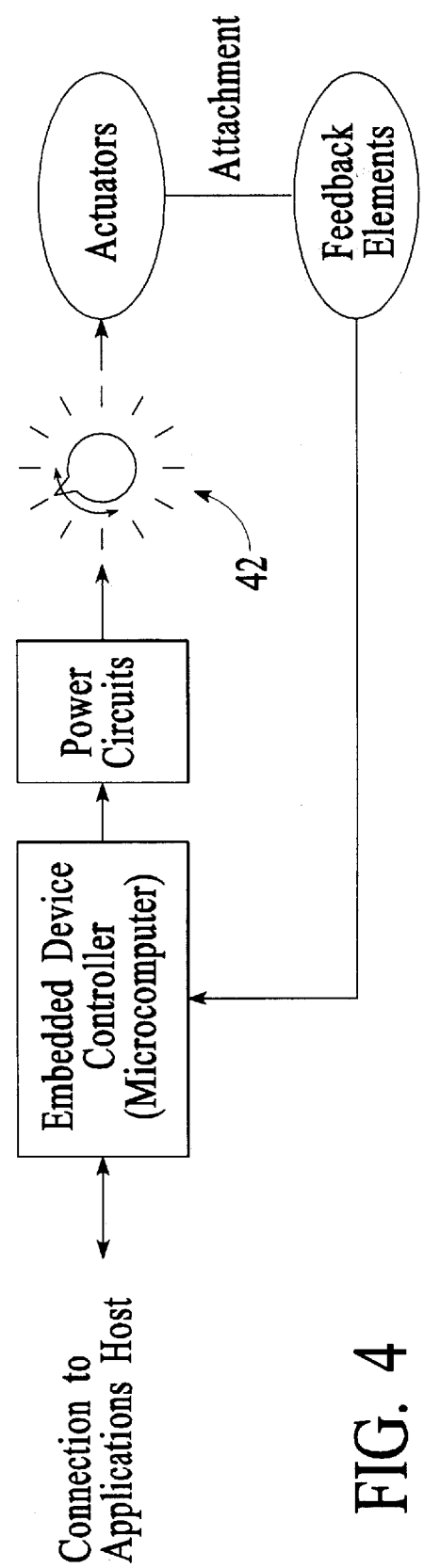
FIG. 4 is a block diagram which illustrates how the invention may be integrated directly into the power-controlling system of a force-feedback device actuator.

In a hardware or combined hardware/software embodiment of the invention, the slider, knob, or other variable attribute control device may be physically implemented. In an embedded haptic control environment, for example, the apparatus and methods may be integrated directly into the device control architecture. As shown in FIG. 3, a particular attribute may be sampled by a controller 32 and then used to modulate force-generation hardware such as power circuits 34 and/or actuators 36. Alternatively, as shown in FIG. 4, a control 42 may be integrated directly on the power controlling system of a device actuator, that is, in-line with electric power, pneumatics, or hydraulics.

Figure 5:
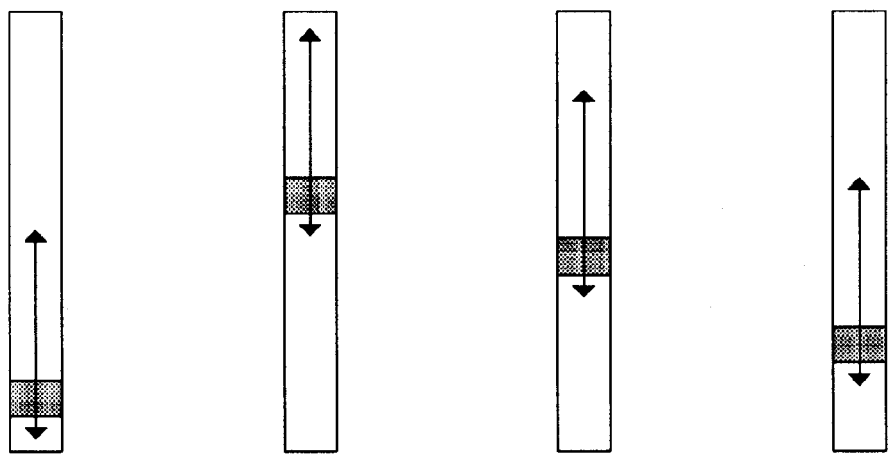
FIG. 5 is a drawing which shows how multiple inputs may be used to control different attributes.
Figure 6A:
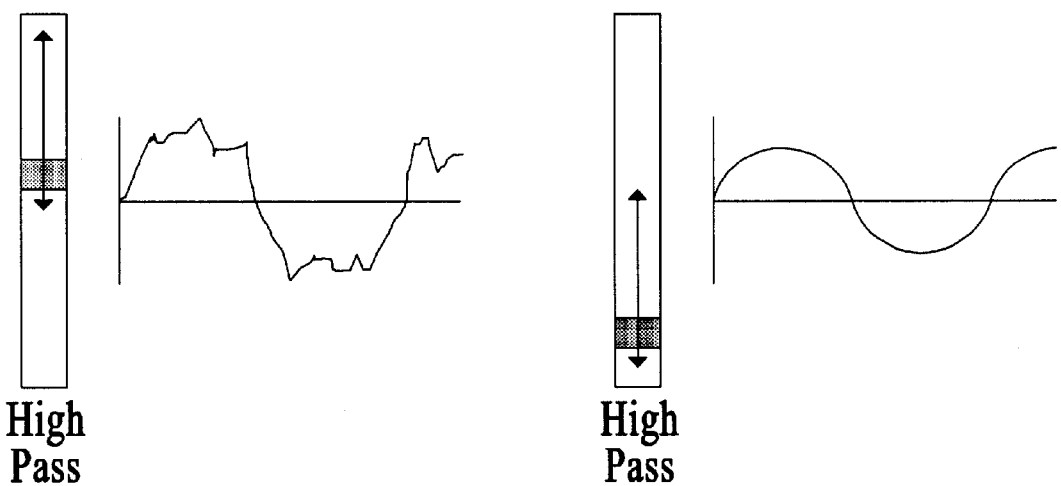
FIG. 6a is a drawing which illustrates how high frequencies may be removed or attenuated according to the invention.
Figure 6B:
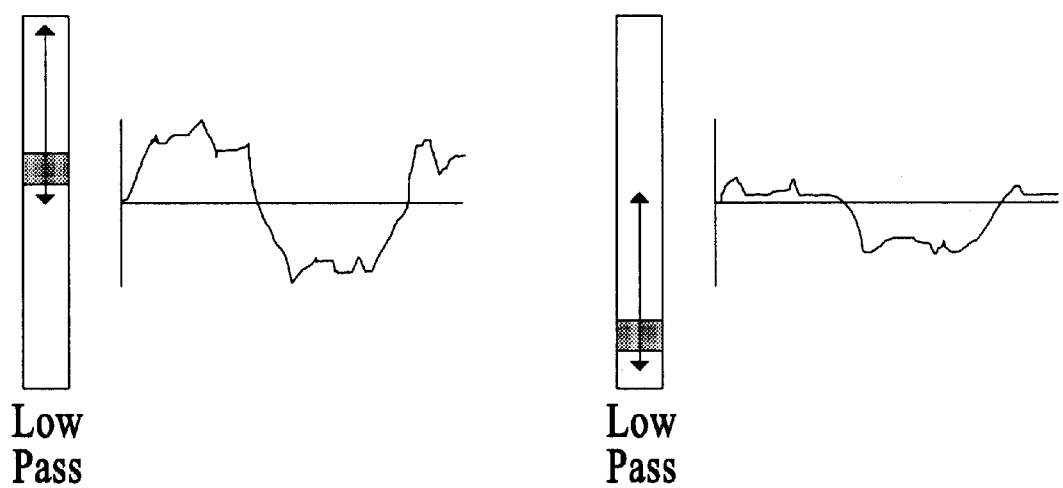
FIG. 6b is a drawing which shows how low frequencies may be removed of attenuated according to the invention.
Figure 7:
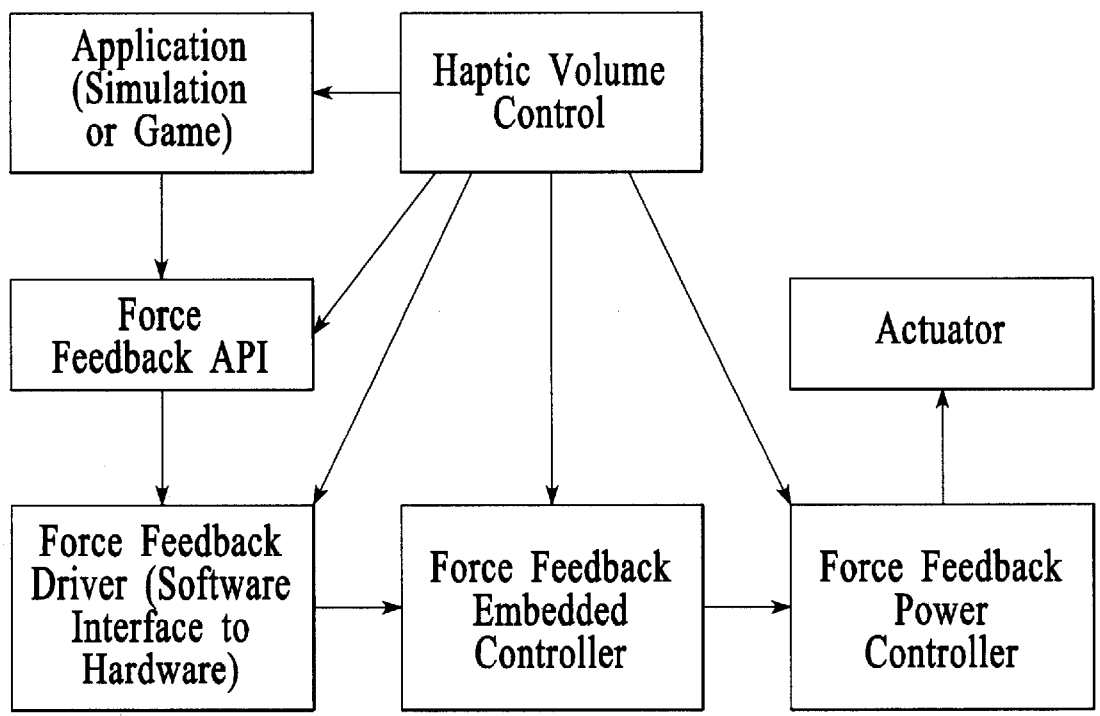
FIG. 7 is a block diagram which illustrates various points in a standard haptic device implementation wherein attribute control(s) may be inserted according to the invention.
Figure 8:
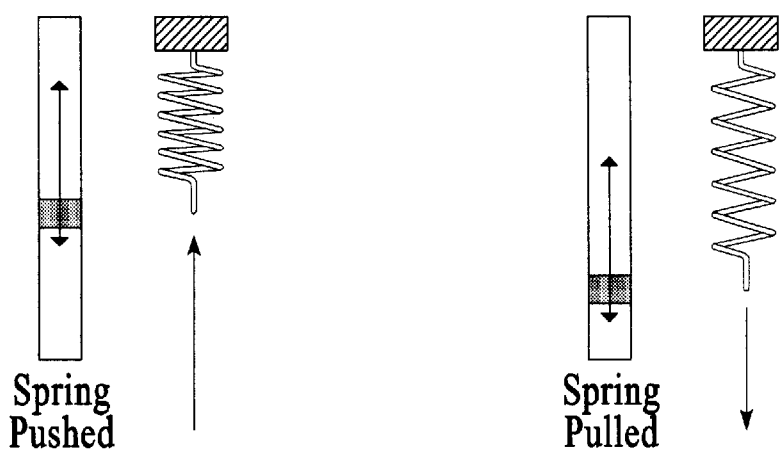
FIG. 8 is a two-part drawing used to show how the invention may be used to set a spring-force level.
Figure 9:
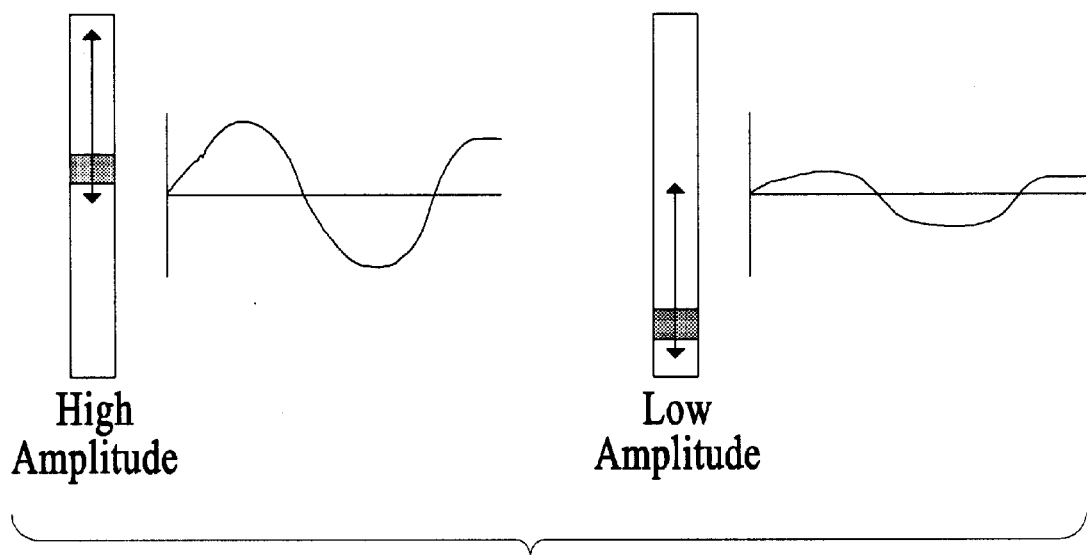
FIG. 9 is a two-part drawing used to show how the invention may be used to set an amplitude level.
Figure 10:
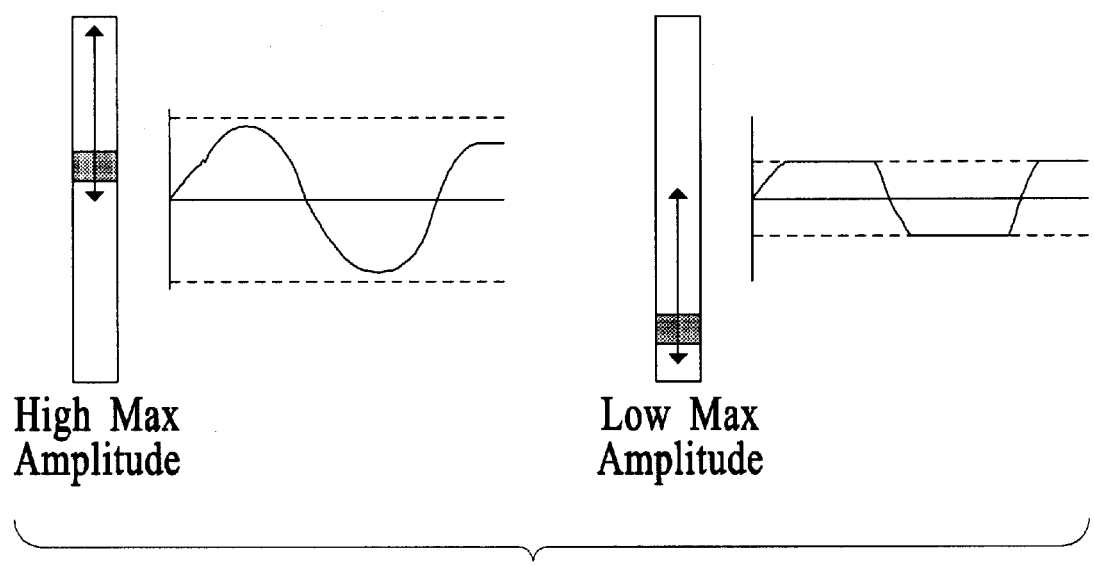
FIG. 10 is a two-part drawing used to show how the invention may be used to set an overall maximum amplitude level.
Figure 11:
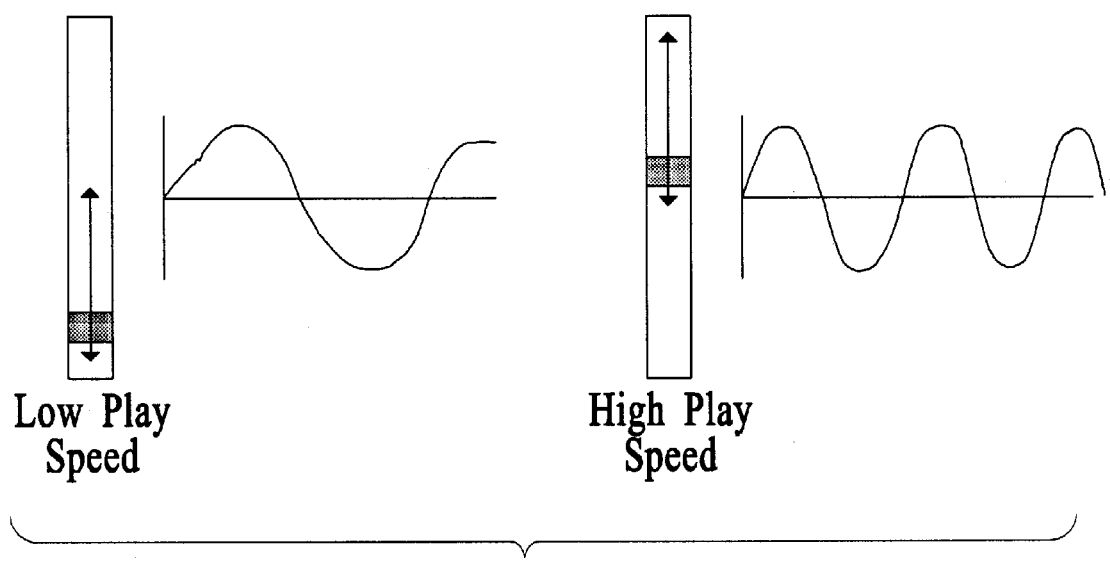
FIG. 11 is a two-part drawing used to show how the invention may be used to set the level of frequency of play-out or oscillation.
Figure 12:
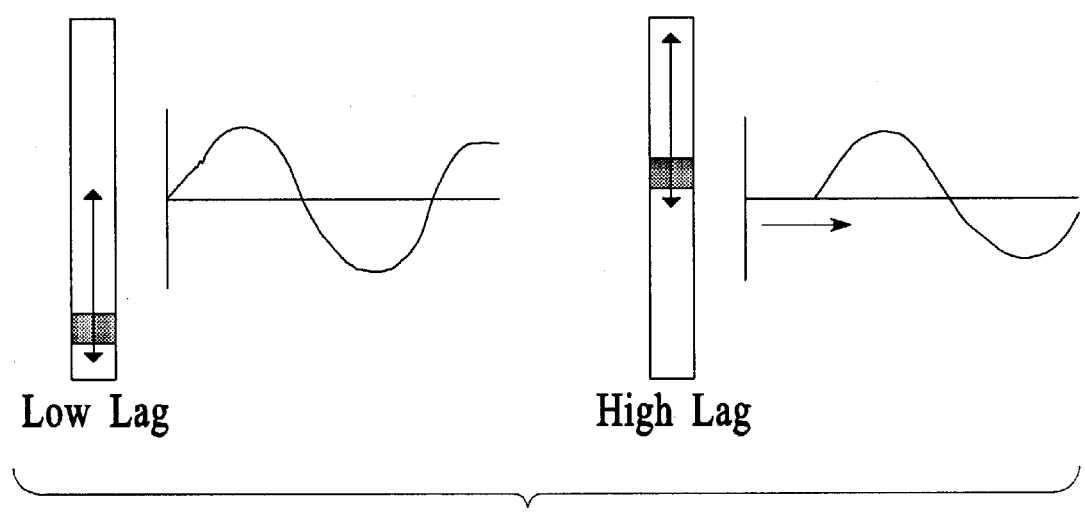
FIG. 12 is a two-part drawing used to show how the invention may be used to set the level of time lag/lead of play-out or phase.
Figure 13:
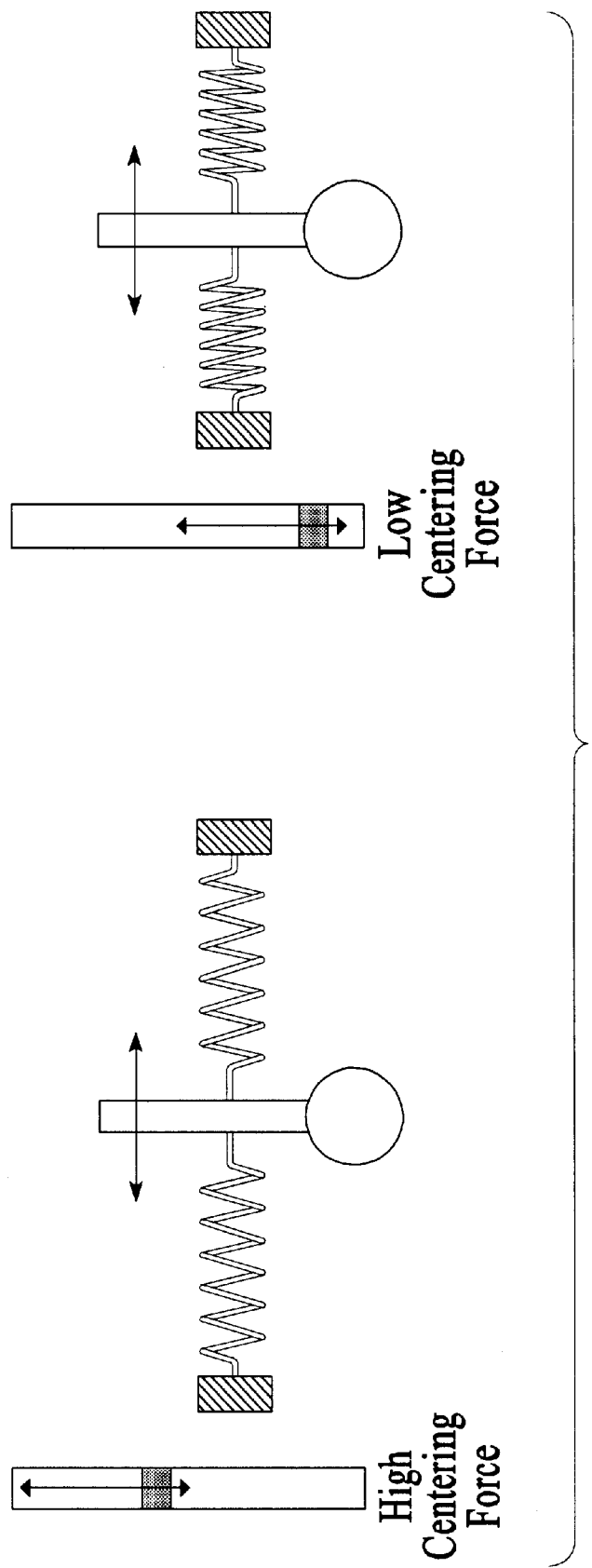
FIG. 13 is a two-part drawing used to show how the invention may be used to set the level of high and low centering force.
Figure 14:
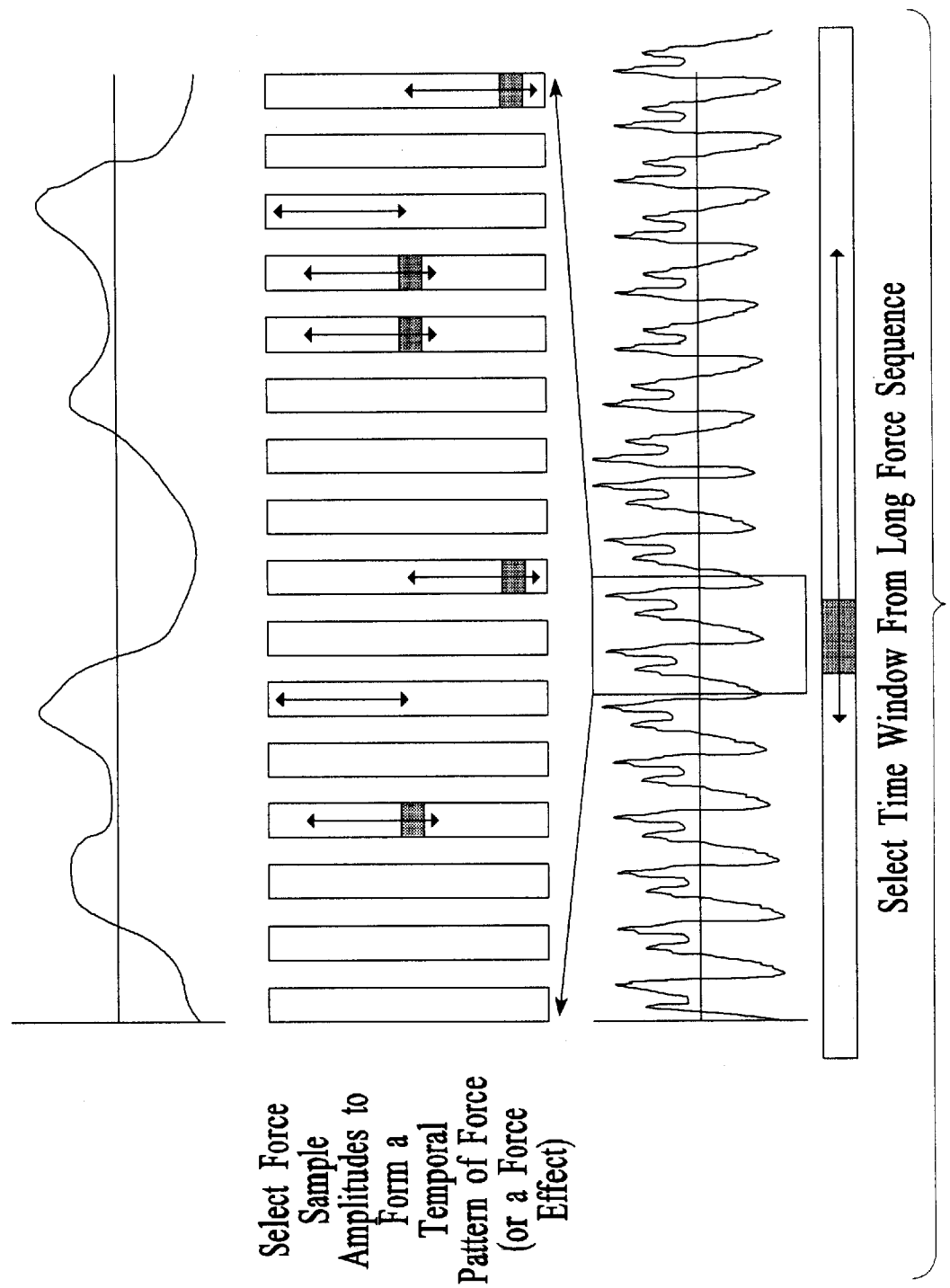
FIG. 14 is a drawing which illustrates how the signal level of one or several force samples may be managed in a temporal sequence according to the invention.

Regardless of implementation, multiple controls, as shown in FIG. 5, may be provided at, or between, system integration points, as shown in FIG. 7, to alter or set specific attributes such as those depicted in FIGS. 6a, 6b, and 8–13. Alternatively, the signal level of one or several force samples may be managed in a temporal sequence, as shown in FIG. 14. By controlling the level of each of a sequence of values using attribute control according to the invention, a user or developer may directly design the force output waveform desired without an underlying force generation formula or function. FIG. 14 also shows a control below the waveforms which can be used to select a time window from a long force sequence. Attributes may also be specified without geometric simulation of force probe and the virtualized physical objects with which the force probe interacts.

As one specific example, consider the use of a force feedback joystick for a personal computer game. The force-feedback joystick may use the inventive control to set the level of native device attributes, such as spring force (FIG. 8), vibration amplitude levels (FIG. 9), overall maximum amplitude levels (FIG. 10), frequency of play-out or oscillation (FIG. 11) , time lag/lead of play-out or phase (FIG. 12), non-linear signal modification attenuating high, mid range, or low frequency content (FIG. 6), and so forth. Application command effects levels may also be controlled.

Through attribute control according to the invention, a user or software developer may modify the simulated spring centering forces of the joystick to emulate specific passive standard joysticks (FIG. 13), or may tailor effects to user preferred levels. In addition, the user or programmer can control the strength of force-feels (i.e., full sequence of force play outs) from games or simulations to minimize or maximize effects on game play in accordance with user preference(s).

We claim:

1. A method for providing control over force output from a force feedback device, said force feedback device being coupled to a host computer, the method comprising:

providing a graphical control in a graphical environment displayed by said host computer, wherein a user of said force feedback device can adjust said graphical control to a plurality of settings by interfacing via said graphical environment with said graphical control, said graphical control being settable to a particular one of said plurality of settings; and modifying a magnitude of a plurality of force sensations output by said force feedback device in accordance with said particular setting of said graphical control, B wherein the relative magnitude of said plurality of force sensations with respect to each other remains substantially unchanged regardless of which of said settings of said graphical control is set.

2. A method as recited in claim 1, wherein said graphical control is a slider.

3. A method as recited in claim 1, wherein said graphical control is a graphical knob.

4. A method as recited in claim 1, wherein all of said magnitudes of said force sensations output from said actuators are modified in accordance with said setting of said graphical control.

5. A method as recited in claim 1, wherein a program running on said host computer provides a value in accordance with said setting of said graphical control, said value causing said modification of said magnitudes of said force sensations.

6. A method as recited in claim 5, wherein said value is provided to an Application Programmer Interface (API) provided on said host computer, wherein said API modulates force sensation data in accordance with said value and sends said modulated force sensation data to an embedded device controller of said force feedback device.

7. A method as recited in claim 1 wherein said force feedback device includes a joystick, and wherein said graphical control determines an overall amplitude level of a centering spring force on said joystick.

8. A method as recited in claim 1, wherein said graphical control determines amplitude levels for a vibration force sensation.

9. A method as recited in claim 1 wherein data representing said particular setting of said graphical control is provided to an embedded force feedback controller of said force feedback device.

10. A force feedback device including a control over force output from said force feedback device, sad force feedback device being coupled to a host computer, the force feedback device comprising:

a movable member having a position or orientation adjustable by a user of said force feedback device;

at least one actuator coupled to said device and capable of outputting a plurality of force sensations to be felt by said user, each force sensation having a magnitude;

at least one sensor that senses motion or position of said movable member, and a control coupled to said force feedback device, wherein a user of said force feedback device can set said control to a particular one of a plurality of available settings, and wherein the magnitude of each force sensation output by said force feedback device is scaled in accordance with said particular setting of said control, wherein the relative magnitudes of said force sensations with respect to each other remains substantially unchanged regardless of which of said settings of said control is set, and wherein said control is integrated in-line directly in a power controlling system of said at least one actuator of said force feedback device such that said control directly adjusts power to said at least one actuator.

11. A force feedback device as recited in claim 10 further comprising an embedded controller in said farce feedback device, said embedded controller controlling said force sensations output by said at least one actuator.

12. A force feedback device as recited in claim 11 wherein said setting of said control is read by said embedded controller, wherein said embedded controller uses said setting in scaling the magnitude of said force sensations.

13. A force feedback device as recited in claim 10 wherein said control is a fit control, and further comprising a second control coupled to said fore feedback device and adjustable by said user to at least two settings, said second control controlling an attribute of said force sensations output by said force feedback device different from said magnitudes.

14. force feedback device as recited in claim 13, wherein said different attribute is a frequency of said force sensations output by said at least one actuator.

15. A force feedback device as recited in claim 13, wherein said different attribute is a phase of said force sensations output by said at least one actuator.

16. A force feedback device as recited in claim 13 wherein said different attribute is a centering spring force output by said at least one actuator.

17. A method according to claim 10 wherein the control is a physical control.

18. A force feedback device as recited in claim 17 wherein said physical control is a knob.

19. A force feedback device as recited in claim 17 wherein said physical control is a slider.

* * * * *